United States Patent [19]

Walby et al.

[11] Patent Number: 5,166,781
[45] Date of Patent: Nov. 24, 1992

[54] APPARATUS FOR IDENTIFYING STANDARD AND NON-STANDARD VIDEO SIGNALS

[75] Inventors: Mark D. Walby; Todd J. Christopher, both of Indianapolis, Ind.

[73] Assignee: Thomson Consumer Electronics, Inc., Indianapolis, Ind.

[21] Appl. No.: 698,702

[22] Filed: May 10, 1991

[51] Int. Cl.⁵ .............................................. H04N 9/44
[52] U.S. Cl. ..................................... 358/17; 358/148; 358/149; 358/19; 358/21 R
[58] Field of Search ................... 358/17, 19, 21 R, 25, 358/11, 153, 148, 149, 10, 160

[56] References Cited

U.S. PATENT DOCUMENTS

| | | |
|---|---|---|
| 4,635,099 | 1/1987 | Nicholson et al. ..................... 358/17 |
| 4,665,437 | 5/1987 | Nicholson ............................ 358/148 |
| 4,777,522 | 10/1988 | Parish et al. .......................... 358/17 |
| 4,785,350 | 11/1988 | Beudick et al. ....................... 358/148 |
| 4,821,112 | 4/1989 | Sakamoto et al. ..................... 358/17 |
| 4,860,098 | 8/1989 | Murphy .............................. 358/148 |
| 4,905,083 | 2/1990 | Biegni et al. ......................... 358/148 |
| 5,025,310 | 6/1991 | Selioya et al. ....................... 358/148 |

Primary Examiner—James J. Groody
Assistant Examiner—Michael L. Lee
Attorney, Agent, or Firm—Joseph S. Tripoli; Peter M. Emanuel; Richard G. Coalter

[57] ABSTRACT

A source responsive to a composite video input signal provides line and burst frequency related timing signals. A measuring circuit responsive to the timing signals provides measurement values which tend to repeat when the video input signal is of a given color television standard and tend to exhibit a pseudo-random distribution otherwise. A histogram processor provides a histogram of the measurements occurring within a given time interval and provides an output signal identifying standard and non-standard video input signal based on the histogram of the measurements.

25 Claims, 3 Drawing Sheets

APPARATUS FOR IDENTIFYING STANDARD AND NON-STANDARD VIDEO SIGNALS

FIELD OF THE INVENTION

This invention relates to video signal processing and particularly to apparatus for identifying standard and non-standard video signals.

BACKGROUND OF THE INVENTION

In the NTSC and PAL television systems there is a defined relationship between the horizontal line frequency (Fh) and the color subcarrier frequency (Fsc). In the NTSC color television standard, for example, Fsc equals (455/2)Fh. In the PAL standard, Fsc equals (1135/4)Fh+Fv/2 where Fv is the field frequency (50 Hz).

Some television sources provide output signals which may differ substantially from the standards noted above. Examples include consumer grade video cassette recorders, video disk players, video games and the like. It has been recognized by Nicholson et al., in U.S. Pat. No. 4,635,099 entitled APPARATUS FOR DETECTING NON-STANDARD VIDEO SIGNALS, and by Nicholson in U.S. Pat. No. 4,665,437 entitled ADAPTIVE FIELD OR FRAME STORE PROCESSOR, that such non-standard signals may degrade the operation of television receivers or monitors which employ field or frame processing of video signals for purposes such as comb filtering, progressive scan conversion or temporal noise reduction. Nicholson proposed that non-standard signals be detected so as to appropriately modify the video processing when non-standard signals are present.

An embodiment of the Nicholson et al. non-standard signal detector includes a coincidence detector which compares coincidence of line rate input signal pulses with line rate pulses derived by counting down a clock signal locked to the color burst component of the input signal and synchronized to the line rate input signal by feedback. A retriggerable monostable multivibrator, having a period equivalent to 25 line intervals, is triggered by the coincidence detector if pulse coincidence has occurred at least once in every twenty five lines. An output circuit includes a flip-flop which is set if the monostable has been triggered for at least one frame interval thereby signifying the presence of a standard video input signal. Advantageously, this latter feature of requiring positive detection of standard signals for a fixed period of time tends to reduce the "false alarm" rate of the detector. False alarms, or invalid detections, may result for video input signals having a poor signal-to-noise ratio.

Another example of a non-standard signal detector is described by Sakamoto et al. in U.S. Pat. No. 4,821,112 entitled DETECTION CIRCUIT FOR DETECTING STANDARD TELEVISION SIGNALS AND NON-STANDARD TELEVISION SIGNALS which issued Apr. 11, 1989. An embodiment of their detector includes a synchronization separation circuit, an APC circuit, a frequency division circuit connected to the APC circuit, and a comparator circuit connected to the frequency division circuit and the synchronization circuit. In operation, the frequency of the chrominance subcarrier signal is divided by the frequency division circuit and the phase of the chrominance subcarrier signal thus frequency divided is compared with the phase of the synchronizing signal separated by the synchronizing separation circuit. False alarms (detection errors) in this system are reduced by connecting an integrator to the output of the comparator circuit.

SUMMARY OF THE INVENTION

The present invention resides, in part, in recognizing the need for providing a detector for identifying standard and non-standard video signals to provide a relatively high level of detection sensitivity, a relatively high detection speed and a relatively low false alarm rate.

A detector embodying the invention includes an input processor for providing measurements related to a ratio of the color burst and line frequency components of a video input signal which measurements tend to repeat for video input signals conforming to a given color television standard. A histogram processor provides a histogram of the measurements occurring within a given time interval and provides an output signal identifying standard and non-standard video input signal based on the histogram of the measurements.

BRIEF DESCRIPTION OF THE DRAWING

The invention is illustrated in the accompanying drawing wherein like elements are denoted by like reference designators and in which.

DETAILED DESCRIPTION

Figure 1:
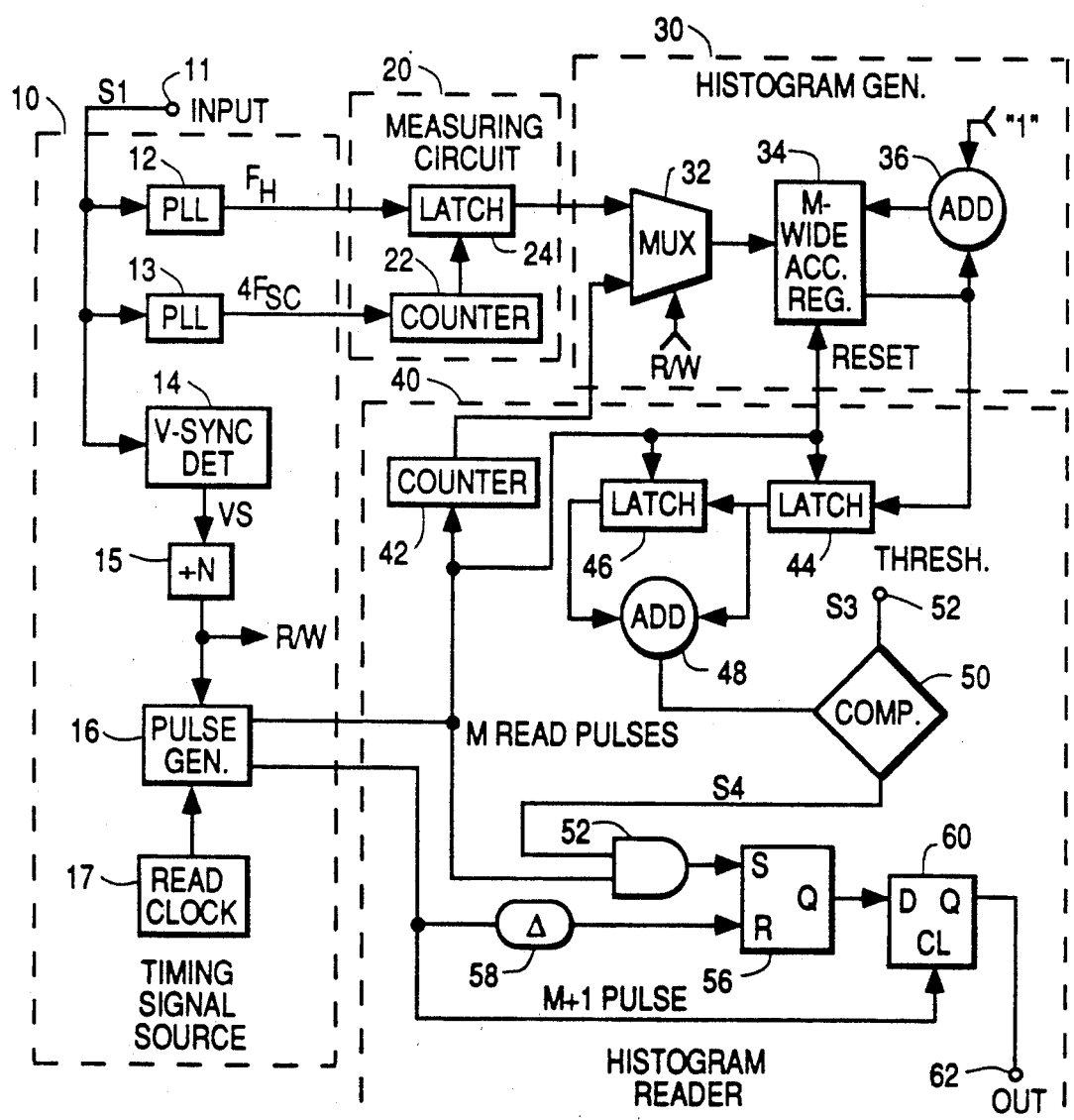
FIG. 1 is a block diagram of a detector for standard and non-standard signals embodying the invention.

The present invention, as embodied in the specific example of FIG. 1, utilizes statistical signal processing techniques for identifying standard and non-standard video signals. This represents a substantial departure from the conventional methods of direct measurement of frequency or period ratios such as those previously described and provides advantages, as will be explained, in terms of speed, sensitivity and reduced "false alarm" rate.

Of the various statistical signal processing techniques which are known, there is one specific technique applicable to meeting the objectives of the present invention. That specific process technique comprises "histographic" processing described in detail later. Briefly, this processing includes (1) making pseudo-random measurements related to a sub-carrier vs line rate ratio, (2) generation of a histogram of the measurements and (3) interpretation or "reading" of the histogram. In addition, to resolve a particular statistical ambiguity which can occur in standard signal identification, the system also includes provisions for (4) histogram modification prior to reading.

To simplify the following description of the embodiment of FIG. 1, the block diagram has been divided by dashed or "phantom" lines into four areas comprising a timing signal source 10, a measuring circuit 20, a histogram generator 30 and a histogram reader 40. It will be appreciated that the invention is defined by the claims which follow this description and the division by dashed lines is merely for convenience of explanation of the principles of the invention.

It is helpful to an understanding of the invention to briefly consider some of the more important features of the block diagram before discussing the individual elements in detail. The main function of the timing source 10, for example, is to provide line frequency (Fh) and burst related (4Fsc) signals to be measured. The line frequency signal is used to randomly sample the count of a modulo-M counter clocked by the burst related signal. An indication as to whether the signals are of standard or non-standard form is obtained by statistically determining if there is a pattern or tendency for the measurement or "sampled" values to repeat. The histogram generator 30 forms the pattern of measurements by counting the number of times that each one of a plurality, M, of measurement values occurs within a measurement interval of a few fields and the M totals are stored in respective ones of M registers or "bins" of an accumulator register thereby forming a histogram of the measurements or samples. The term "bin" will hereinafter be used interchangeably with the terms "register", "storage register" or "accumulator register". The histogram reader 40 modifies the "bin" data to resolve a particular ambiguity, discussed later, and determines if the total count in any one bin (or two adjacent bins, as will be explained) meets a minimum threshold level. Generally, the histogram of standard signals will be mainly concentrated in a single "bin" or in two adjacent bins on a random basis whereas the histogram of non-standard signals will tend to be spread among all of the M bins of the histogram.

Considering now the details of the detector of FIG. 1, the timing signal source 10 comprises an input terminal 11 for receiving a composite video input signal S1. This signal may be of the NTSC or PAL standards having a defined relationship of color burst and line frequencies as previously described or it may be a non-standard signal in which the relationship does not conform to NTSC or PAL standards. In the following discussion it will be assumed that the input signal S1 is of the NTSC standard in which there are 455/2 subcarrier cycles per line.

Within source 10 the composite video signal S1 is applied to a first phase lock loop (PLL) 12 which is locked to the line frequency (Fh) of the input signal to provide an output signal at the horizontal line rate Fh. The signal S1 is also applied to a second phase lock loop (PLL) 13 which includes a divide by four divider (not shown) in the loop VCO feedback path thereby locking the loop VCO to a frequency of four times the color burst frequency. Since the color subcarrier has 455/2 cycles per line, the 4Fsc signal provided by PLL 13 will have 910 cycles per line. Locking of the second PLL 13 to a frequency of 4Fsc provides a measurement resolution or "window", so-to-speak, of about 69.5 nanoSeconds as will be discussed later. The number "910" is of significance (for the assumed NTSC input signal) in that it determines, indirectly, the number M of unique measurement values that can be produced by measuring circuit 20 and the number M of bins in the histogram.

The number M is of particular importance in another respect. Specifically, the number M is selected to be a "factor" of the number 910. Some of the factors of "910" include, illustratively, 2, 5, 7, 10, 13, 14, etc. By selecting M to be a factor of 910 it is ensured that measurements of standard signals will produce repeating values and thus produce a peaked histogram whereas measurements of non-standard signals will tend to be random and will produce a broad histogram having no pronounced peaks. This is illustrated later in the discussion of a number of exemplary histograms.

Figure 9:
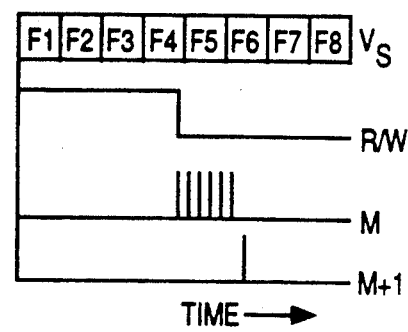
FIG. 9 is a timing diagram illustrating operation of a timing unit in the detector of FIG. 1.

Timing signal source 10 further includes a vertical synchronizing signal detector 14 coupled to the input signal terminal 11 for providing detected vertical synchronizing pulses Vs. These pulses are applied to a divider (or counter) 15 which divides the pulses by a factor "N". This provides a read/write (R/W) control signal that is used later for controlling the operation of the histogram generator and reader. This control signal determines the time interval during which a histogram is generated. By way of example, in a preferred application of the principles of the invention N is selected to provide a two frame timing interval. This is illustrated in FIG. 9 where the uppermost timing signal represents the vertical sync pulses Vs for an eight frame interval (F1-F8) and the next waveform labeled R/W illustrates the timing of the read write signal which is high for four fields (F1-F4) and low for the next four fields (F5-F8).

The choice of a two frame interval for histogram processing is advantageous in that it includes a complete four field color sequence in the NTSC system. Moreover, this choice also ensures reliable detection of non-standard signals produced by certain types of video sources which produced mixed standard and non-standard signals during consecutive frames. An example is a laser disc player operating in a freeze frame mode in which the frozen signal burst phasing is correct for a one frame interval but does not conform to the NTSC standard from frame to frame. This form of non-standard signal is detectable in the present invention by the choice of a two-frame period for generation of the histogram. Longer periods may be used if desired for increased sensitivity. The "false alarm" or error rate is inversely proportional to the number of "bins" or storage registers of the histogram. In other words, as the parameter "M" is made larger, the greater is the ability of the system to distinguish standard from non-standard signals and the likelihood of an error being made is reduced.

In source 10 the read/write signal is also applied to a pulse generator 16 which receives timing pulses from a read clock 17. The purpose of generator 16 is to provide a number M of read pulses responsive to the read clock 17 after a measurement cycle. This is illustrated in FIG. 9 by the third waveform which show M pulses being produced after the falling transition of the read/write signal. The number M of clock pulses produced is selected to equal the number of storage registers or "bins" in the histogram generator 30. A further pulse, M+1, is provided after the M pulses as shown in FIG. 9 by the M+1 waveform. The M+1 pulse is provided after the M pulses (which read the histogram) for storing the result of the histogram interpretation into an output latch. The read clock 17 may be of any suitable frequency sufficient to "read" a small number (M) of bins in a measurement cycle and need not be related to other timing functions other than being produced within a read cycle interval. In this example of the invention four fields are used for a measurement cycle and 14 bins are used for storage of measurements. For this purpose the read clock 17 signal may be taken from PLL 12. The timing of signals M and M+1 may be produced by applying Fh or some other suitable source (e.g., clock 17) to a counter that is reset during a histogram write cycle by the read/write pulse and applying the counter output to a decoder for generating M pulses plus a later pulse M+1 after a measurement cycle of four fields.

The measurement circuit 20 comprises a counter 22 of modulo M that is clocked by the 4Fsc signal and a latch 24 that "samples" and stores the count of the counter once each line in response to the line rate signal Fh. It will be noted that this method of measurement of the burst and line frequencies is asynchronous in that the counter is not synchronized in any way with the operation of the latch. Stated another way, the latch takes random samples of the count provided by counter 22. The counter 22 is, in a sense, "free running" with respect to horizontal synchronizing intervals in that it counts the 4Fsc signals in modulo M without regard to the timing of the line synchronizing signal Fh.

As will be apparent from the following discussion, measurement circuit 20 is of a special type in which measurement values tend to repeat when the video input signal is of a given color television standard. The measurement values tend to exhibit a pseudo-random distribution when the video input signal is not of the given color television standard. The measurement circuit, in other words, tends to "randomize" measurements of non-standard signals.

Figure 2:
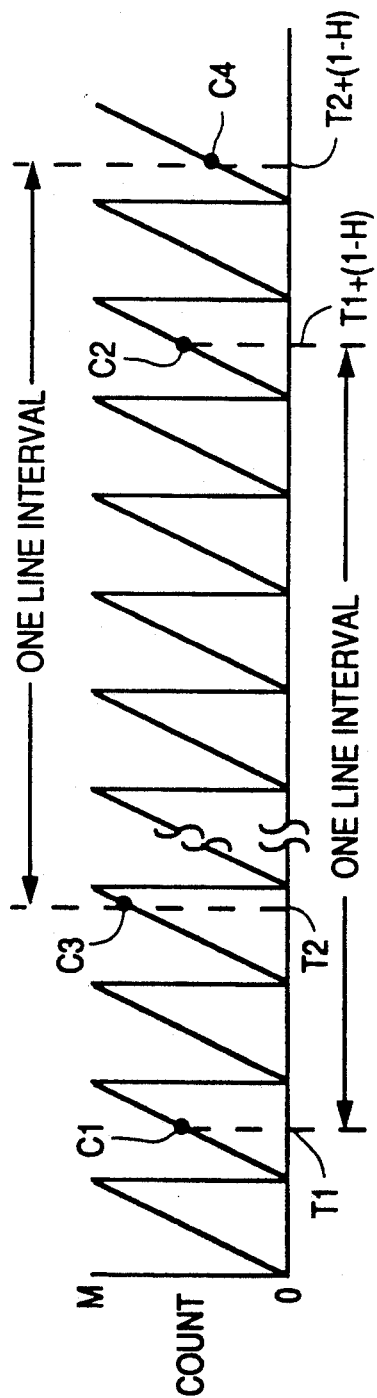
FIGS. 2 and 3 are diagrams illustrating operation of an asynchronous measurement circuit of the embodiment of FIG. 1.

FIG. 2 provides a first example of operation of the measurement circuit 20. In FIG. 2 the sawtooth waveform represents the count of counter 22 as a function of time. This count begins at zero and reaches a maximum of M−1 counts thereby providing a total of M discrete count values. Stated another way, the counter is simply reset to zero upon the occurrence of the Mth count and so there are a total (counting the count value of zero) of M count values. In this example, where M=14, the lowest count value in binary notation is 0000 for the starting count and 1101 for the highest count.

For the assumed value of M=14 and a clock frequency of 4Fsc, counter 22 will cycle through 65 cycles during one line interval. Since 65 cycles are too many to effectively illustrate in the drawing the time line is broken so as to show the starting and ending portions of a one line interval. Of importance, if a standard signal is present the count at the end of 65 cycles of counter 22 will be equal to (or within one count) of the count at the start of a measurement cycle whereas non-standard signals will result in counts that differ from line to line. This is illustrated in FIG. 2 by a specific example where the count C1 taken at time T1 is seen to be the same as count C2 taken one line later at time T1+(1−H). Although the actual value of count C1 will be a random number between zero and thirteen (for the case where M=14), it is the repetition of the count later which identifies the standard video signal.

FIG. 2 also provides an example of measurements of non-standard signals. Specifically, at time T2 a sample C3 of the counter 22 output is taken. One line interval later [at time T2+(1−H)] the output of counter 22 is again sampled and the sample C4 is produced. Since C4 does not equal the previous sample value C3, the signal is non-standard. In this connection it will be noted that even a slight deviation of the burst/line frequency ratio of the standard signal will result in a precession of the sample or count values with the end result that non-standard signals will produce a histogram in which all bins are more or less uniformly filled whereas standard signals will tend to be concentrated in a single bin or two bins as will now be described in detail.

Figure 3:
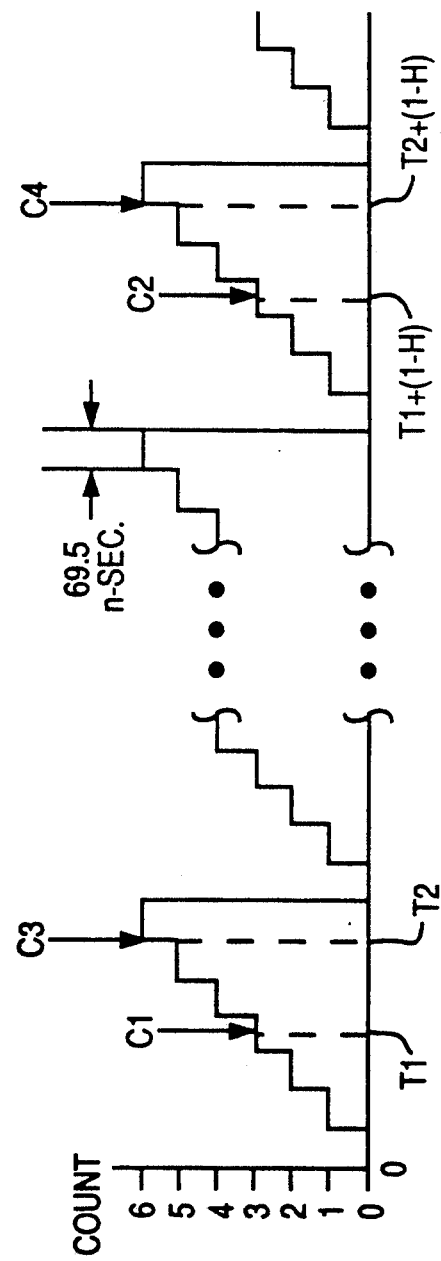

FIG. 3 illustrates why standard signals will be concentrated in one bin or two bins as noted above. The significance of whether one or two bins is filled relates directly to the ability to correctly interpret the histogram. In this connection, FIGS. 4 and 5 illustrate the one-bin vs two-bin problem and FIG. 5 also shows the solution of how this problem may be solved completely so that the "bin spread" of the standard signal, due to random sampling, has no effect at all on ones ability to identify the standard signal.

In more detail, in FIG. 3 the stepped waveform represents the count of counter 22. To simplify the drawing a count modulo of seven is used rather than the preferred value of 14. Consider first the case where at time T1 the count C1 is sampled exactly at the center of the 69.5 nano-Second wide step. It will be assumed initially that there is no noise at all in the system, no jitter and that at the end of one line interval the count C2 is taken again in the exact center of the 69.5 nano-second interval between clock pulses. If these noise-free and perfectly centered counts are then accumulated over a two frame interval there will be a total of 1050 measurements all occuring in the same count bin (e.g., bin 3 in decimal or 0011 in binary) and not a single one of the other bins representing other counts will have any data.

Figure 4:
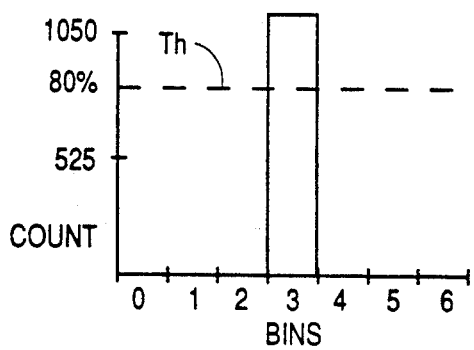
FIGS. 4 and 5 are histograms illustrating operation of the embodiment of FIG. 1 for standard input signals having a relatively high signal-to-noise ratio.

FIG. 4 illustrates the histogram of the above idealized case where all samples are taken in the middle of a count step and there is no noise or jitter at all in the system. As seen, Bin 3 contains all 1050 of the measurements and there are no counts in any adjacent bin. For such a case recognition of a standard signal is unambiguous and may be detected by a comparator having a threshold at any convenient level less than 1050. An 80% threshold level is illustrated by a dashed horizontal line, Th. In practice, the sampling is random and so there is a low likelihood that counter 22 will be always sampled at the middle of a count interval. In fact it is just as likely to be sample during a count transition and this is illustrated in FIG. 2 by the second example where, at time T2 the count C3 is taken at a transition of counter 22 and one line later the count C4 is also taken at or near a transition. Thus, the count C3 might equal either 5 or 6 and the count C4 also might equal 5 or 6. If there is any noise or jitter at all in the system the counts will randomly fall with half in bin 5 and half in bin 6. Since there are 1050 lines in a two frame measurement interval, one would expect the histogram of this example to show two bins, each half full and this condition is illustrated in FIG. 5.

Figure 5:
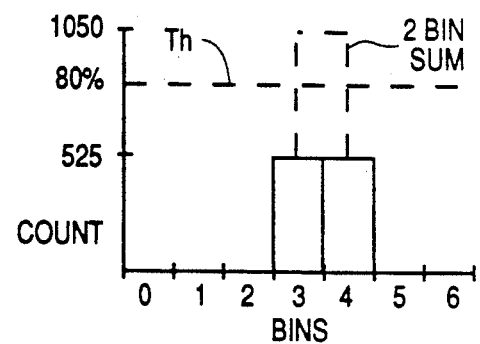

It is instructive to note from the histogram of FIG. 5 that even though the signal is assumed to be a standard signal, the histogram of 1050 samples is spread between two bins rather than being concentrated in a single bin as in the previous example. Since this effect is purely random one is faced with a problem in interpreting the histogram. If a threshold is selected to be low enough to be triggered by the counts in bins 3 or 4 then it will be unnecessarily low for the case where most counts are concentrated in a single bin. The solution to this problem, implemented in the histogram reader 40, is to add adjacent bins. this is shown in FIG. 5 by the dashed bin spanning bins 3 and 4 and labeled "2 BIN SUM". Advantageously, when using the 2 BIN SUM, it does not matter whether a valid signal fills one bin (as in FIG. 4) or two bins (as in FIG. 5). Thus, a single threshold may be set without regard to whether there is bin spreading due to random sampling or not. This threshold is illustrated in both of FIGS. 4 and 5 by the dashed line at the 80% level. Note that in the single bin case of FIG. 4 that the sum of bin 3 and either of the adjacent bins 2 or 4 (both empty) is exactly the same as in the example of FIG. 5 where bins 3 and 4 are added.

Figure 6:
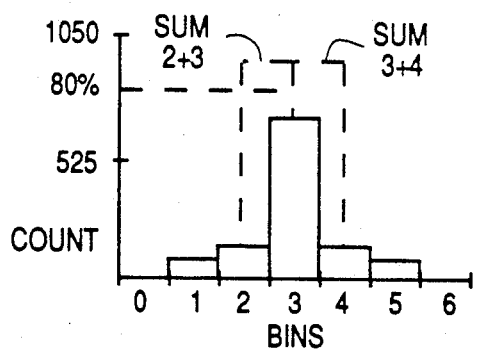
FIGS. 6 and 7 are histograms illustrating operation of the embodiment of FIG. 1 for standard input signals having a relatively poor signal-to-noise ratio.
Figure 7:
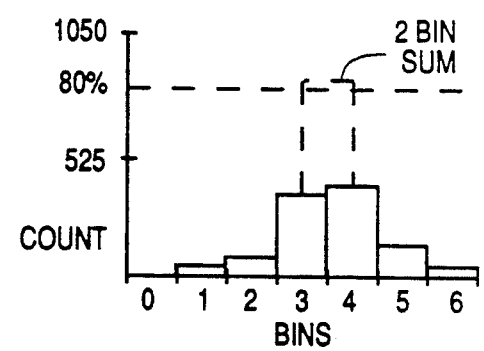
Figure 8:
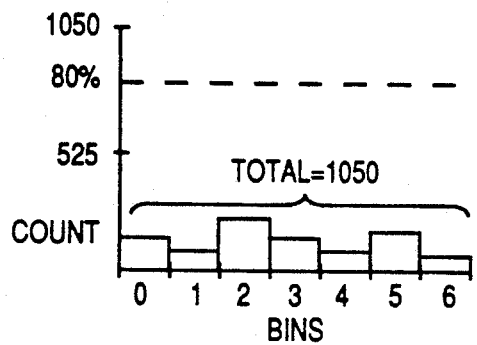
FIG. 8 is a histogram illustrating operation of the embodiment of FIG. 1 for non-standard input signals.

FIGS. 6 and 7 are similar to FIGS. 4 and 5, respectively, except that in these examples it is assumed that the standard signal being detected is of poor signal to noise ratio. The effect of such a condition, as shown, is to slightly depress and spread the histogram. It has been found that a reasonable threshold level of about 80% of the maximum count during a measurement cycle is sufficient to reliably detect such signals. FIG. 8 illustrates the histogram of a non-standard signal. As seen, there is no pronounced peak and the 1050 counts are spread among all of the bins. Moreover the addition of noise to this histogram will not significantly alter its character.

Returning to FIG. 1, the histogram generator 30, as previously explained, generates the histograms discussed above by totaling the number of times that each specific count of the counter 22 occurs during a two frame interval. The generator comprises a multiplex switch 32 that selects read and write addresses for an M-wide accumulator 34 having an adder 36 connected between its data output and input terminals. The term "M-wide" means an accumulator having a number "M" of separately addressable storage locations or "registers". In the present example M is assumed to be 14 so there are 14 "bins" or storage registers in accumulator register 34.

In operation of the histogram generator 30, the timing signal source 10 supplies a write level signal via the read/write line R/W to multiplex switch 32 which selects the count of counter 22 as the address for accumulator register 34. At the start of a measurement cycle all of the M registers are cleared so that all of the registers or "bins" are empty. Each time a measurement is made the adder 36 adds a "one" to the data previously stored at the address provided by the count of counter 22. As an example, if the count of counter 22 equals 0010 at the time it is sampled, then adder 36 increments the register or "bin" at address 0010 by one count. This process continues for a two frame interval at which time a total of 1050 measurements have been made, sorted by the address or bin numbers and stored in the M (e.g., 14) registers of accumulator 34 to provide the histograms previously discussed.

The remaining elements of FIG. 1 comprise the histogram reader 40 which, as previously described, provides the functions of adding the counts of adjacent bins and comparing the sums with a threshold to identify standard and non-standard signals. Reader 40 includes a counter 42 of the same modulo (M=14) as counter 22 in the measuring circuit 20. The function of counter 22 is to sequentially address each of the fourteen registers of accumulator 34 during a histogram read cycle. This function is implemented by connecting the clock input of counter 42 to the output of pulse generator 16 which provides fourteen read pulses at the start of a read cycle as previously explained and shown in FIG. 9.

In response to the "M" (14) read pulses, counter 42 generates fourteen read addresses which are applied to the address input of accumulator 34 by means of multiplex switch 32. The switch 32 is controlled by the read-write signal R/W provided by divider 15 of the timing signal source 10. The M read pulses are also applied to a reset input of accumulator 34 and to the clock inputs of a pair of latches 44 and 46 connected serially to the data output of accumulator 34. Upon the occurrence of the first of the M read pulses the data stored at the address indicated by counter 42 is latched in latch 44, the data previously stored in latch 44 is shifted to latch 46. The storage register containing the data that is latched in latch 44 is concurrently reset to zero. This process continues until all M registers have been interrogated for data and reset to zero.

The data shifted through latches 44 and 46 during reading of the M storage registers (bins) is applied to an adder 48 which adds the contents of adjacent bins, as previously explained, to provide a sum signal S2 representative of the sum of the data of adjacent bins. This addition step provides the advantage previously described of eliminating sampling ambiguities due to the random measurements of the input signals. A comparator 50 compares the two bin sum data signal S2 with a threshold value signal S3 applied to an input 52 and provides an output signal S3 indicative of the relative magnitudes of the input signals. As previously noted, a suitable threshold is about 80% of the maximum possible count which, in this example is 80% of 1050 where NTSC signals are assumed and one measurement per line is made for a two frame-interval. If S2 is greater than the threshold value S3, then the comparator output signal S4 enables an AND gate that is primed by the M pulses and sets a flip-flop 56. On the other hand, if S2 is not greater than S3, gate 52 is not enabled and flip-flop 56 is not set.

The foregoing process repeats until each of the 14 memory locations in the accumulator have been tested by comparator 50. At the end of this period flip-flop 56 will be in a SET condition if any one of the measurements exceeds the threshold level S3, otherwise flip-flop 56 will be in its initial (RESET) condition. After the last of the 14 histogram read pulses, a 15th pulse is produced for latching the result of the measurement and resetting flip-flop 56 if it had been set during the measurement cycle. These functions are provided by a delay unit 58 and a further flip-flop 60 in response to the M+1 pulse provided by pulse generator 16. Specifically, at the end of a measurement cycle flip-flop 56 will either be SET (signifying a standard signal) or RESET (signifying a non-standard signal). The state of flip-flop 56 is stored by applying the Q ("true") output of flip-flop 56 to the D ("data") input of a D-type flip-flop 60 and clocking flip-flop 60 by the "M+1" pulse. Accordingly, flip-flop 60 will store the status (SET or RESET) of flip-flop 56 at the end of the histogram read cycle upon the occurrence of the "M+1" pulse. The timing of this pulse and the M pulses are shown in FIG. 9 and has been previously shown and discussed. To ensure that the initial condition of flip-flop 56 is RESET for the next histogram processing cycle, the "M+1" pulse is delayed by a delay device 58 (e.g., a gate delay) and applied to the reset input of flip-flop 56.

Various changes may be made to the embodiment of the invention herein shown and described. As previously mentioned, the number M which determines the number of histogram "bins" (i.e., accumulator registers) may be increased if finer histogram resolution and lower error (false alarm) rates are desired or it may be lowered in less demanding applications. It is preferred that the histogram measurement interval include at least two frames because of the problem with certain video sources such as the video disc player operating in a freeze frame mode previously discussed. However, satisfactory detection may be achieved for the great majority of video sources with a shorter measurement interval. Although the invention has been illustrated with a specific example of detection of NTSC standard video signals, the principles also apply to video signal sources of the PAL standard as previously mentioned.

What is claimed is:

1. A detector for identifying standard and non-standard video signals, comprising:
    a timing signal source responsive to a composite video input signal for providing a first signal having a frequency proportional to a line frequency component of said input signal and for providing a second timing signal having a frequency proportional to a color burst component of said input signal;
    a measuring circuit responsive to said timing signals for providing measurement values which tend to repeat when said video input signal is of a given color television standard, said measurement values tending to exhibit a pseudo-random distribution when said video input signal is not of said given color television standard; and
    histogram processing means coupled to said measuring circuit and responsive to said measurement values for providing an output signal identifying standard and non-standard video input signals.

2. A detector as recited in claim 1 wherein said measuring circuit comprises:
    a counter having a clock input to which said second timing signal is applied for continuously counting cycles of said second timing signal; and
    a latch for sampling the count of said counter to provide a measurement value in response to each occurrence of said first timing signal.

3. A detector as recited in claim 2 wherein:
    said counter is of modulo "M" and
    "M" is less than the number of occurrences of said second timing signal within one period of said first timing signal.

4. A detector as recited in claim 2 wherein:
    for standard video input signals said second timing signal exhibits a frequency K times that of said first timing signal;
    said counter is of modulo M; and
    M is a factor of K.

5. A detector as recited in claim 4 wherein:
    the number "M" is a factor of the number 910.

6. A detector as recited in claim 1 wherein said histogram processing means comprises:
    a histogram generator coupled to said measurement circuit for providing a histogram of said measurements occuring within a given time interval; and
    a histogram reader coupled to said generator and responsive to said histogram for providing said output signal identifying said standard and non-standard video input signals.

7. A detector as recited in claim 6 wherein said histogram includes a plurality of bins containing data indicative of the frequency of distribution of said measurement values occurring within said given interval; and wherein
    said histogram reader includes arithmetic processing means for adding the data of adjacent bins of said histogram; and
    threshold detection means coupled to said arithmetic processing means for providing said output signal identifying said standard and non-standard signals.

8. A detector as recited in claim 2 wherein said histogram processing means comprises:
    a histogram generator coupled to said measurement circuit for providing a histogram of said measurements occurring within a given time interval; and
    a histogram reader coupled to said generator and responsive to said histogram for providing said output signal identifying said standard and non-standard video input signals.

9. A detector as recited in claim 8 wherein said histogram includes a plurality of bins containing data indicative of the frequency of distribution of said measurement values occurring within said given interval; and wherein
    said histogram reader includes arithmetic processing means for adding the data of adjacent bins of said histogram; and
    threshold detection means coupled to said arithmetic processing means for providing said output signal identifying said standard and non-standard signals.

10. A detector as recited in claim 3 wherein said histogram processing means comprises:
    a histogram generator coupled to said measurement circuit for providing a histogram of said measurements occurring within a given time interval; and
    a histogram reader coupled to said generator and responsive to said histogram for providing said output signal identifying said standard and non-standard video input signals.

11. A detector as recited in claim 10 wherein said histogram includes a plurality of bins containing data indicative of the frequency of distribution of said measurement values occurring within said given interval; and wherein
    said histogram reader includes arithmetic processing means for adding the data of adjacent bins of said histogram; and
    threshold detection means coupled to said arithmetic processing means for providing said output signal identifying said standard and non-standard signals.

12. A detector as recited in claim 2 wherein said histogram processing means comprises:
    a histogram generator including an accumulator having address inputs coupled to data outputs of said latch and including an adder coupled to increment registers of said accumulator addressed by said address inputs during a predetermined time interval; and
    a histogram reader for recovering data accumulated in said accumulator during said predetermined time interval and including a threshold detector responsive to the recovered data for providing said identification signal.

13. A detector as recited in claim 12 wherein said histogram reader includes arithmetic processing means for combining data of adjacent registers of said accumulator for application to said threshold detector.

14. A detector as recited in claim 12 wherein said predetermined interval comprises at least a two frame periods of said video input signal.

15. A detector for identifying standard and non-standard video input signals, comprising:

a timing signal source responsive to a composite video input signal supplied thereto for providing a first timing signal having a frequency proportional to the line rate of said video input signal and for providing a second timing signal having a frequency proportional to a multiple of the color burst frequency of said video input signal;

a counter having a clock input coupled to receive said second timing signal for continuously counting cycles of said second timing signal;

a latch coupled to said counter and responsive to said second timing signal for sampling and storing the count of said counter upon each occurrence of said first timing signal; and a histogram processor having inputs coupled to data outputs of said latch and having an output for providing an identification signal of a first level indicative of a standard video signal when said data of said latch exhibits a peaked histogram, said identification signal being of a second level otherwise.

16. A detector as recited in claim 15 wherein:
said counter is of modulo "M"; and
"M" is a number less than the number of occurrences of said second timing signal within one period of said first timing signal.

17. A detector as recited in claim 15 wherein:
said timing second timing signal exhibits a frequency substantially equal to K times that of said first timing signal when said video input signal is of a given color television standard;
said counter is of modulo M; and
the number M is a factor of K.

18. A detector as recited in claim 16 wherein:
the modulo "M" of said counter is a factor of the number 910.

19. A detector as recited in claim 15 wherein said histogram processor comprises:
a histogram generator including an accumulator having address inputs coupled to data outputs of said latch and including an adder coupled to increment registers of said accumulator addressed by said address inputs during a predetermined time interval; and
a histogram reader for recovering data accumulated in said accumulator during said predetermined time interval and including a threshold detector responsive to the recovered data for providing said identification signal.

20. A detector as recited in claim 19 wherein said histogram reader includes arithmetic processing means for combining data of adjacent registers of said accumulator for application to said threshold detector.

21. A detector as recited in claim 19 wherein said predetermined interval comprises at least a two frame period of said video input signal.

22. A non-standard signal detector comprising:
a source for providing a composite video input signal;
an input processor for providing measurements related to a ratio of color burst and line frequency components of said composite video input signal, said measurements tending to exhibit a given frequency distribution when said video input signal conforms to a given color television standard and a different frequency distribution otherwise;
a histogram generator coupled to said input processor for providing a histogram of said measurements occluding within a given time interval; and
a histogram reader coupled to said generator for providing an output signal identifying standard and non-standard video signals based on said histogram of said measurements.

23. A detector as recited in claim 22 further comprising:
a filter in said histogram reader for filtering said histogram supplied to said histogram reader.

24. A detector as recited in claim 23 wherein said histogram generator includes a plurality of bins, each bin containing a count of the number of measurements of a given value occurring within said given time interval and wherein:
said filter comprises an adder for adding the counts of adjacent bins.

25. A detector as recited in claim 22 wherein said input processor comprises:
a counter having an input coupled to receive a clock signal proportional to the frequency of said color burst component; and
a sampling circuit responsive to said line frequency component for providing samples of the count provided by said counter;
said counter having a modulo, M, which is less than the number of cycles of said clock signal occurring within one line period of said video input signal.

* * * * *